Figure 1:
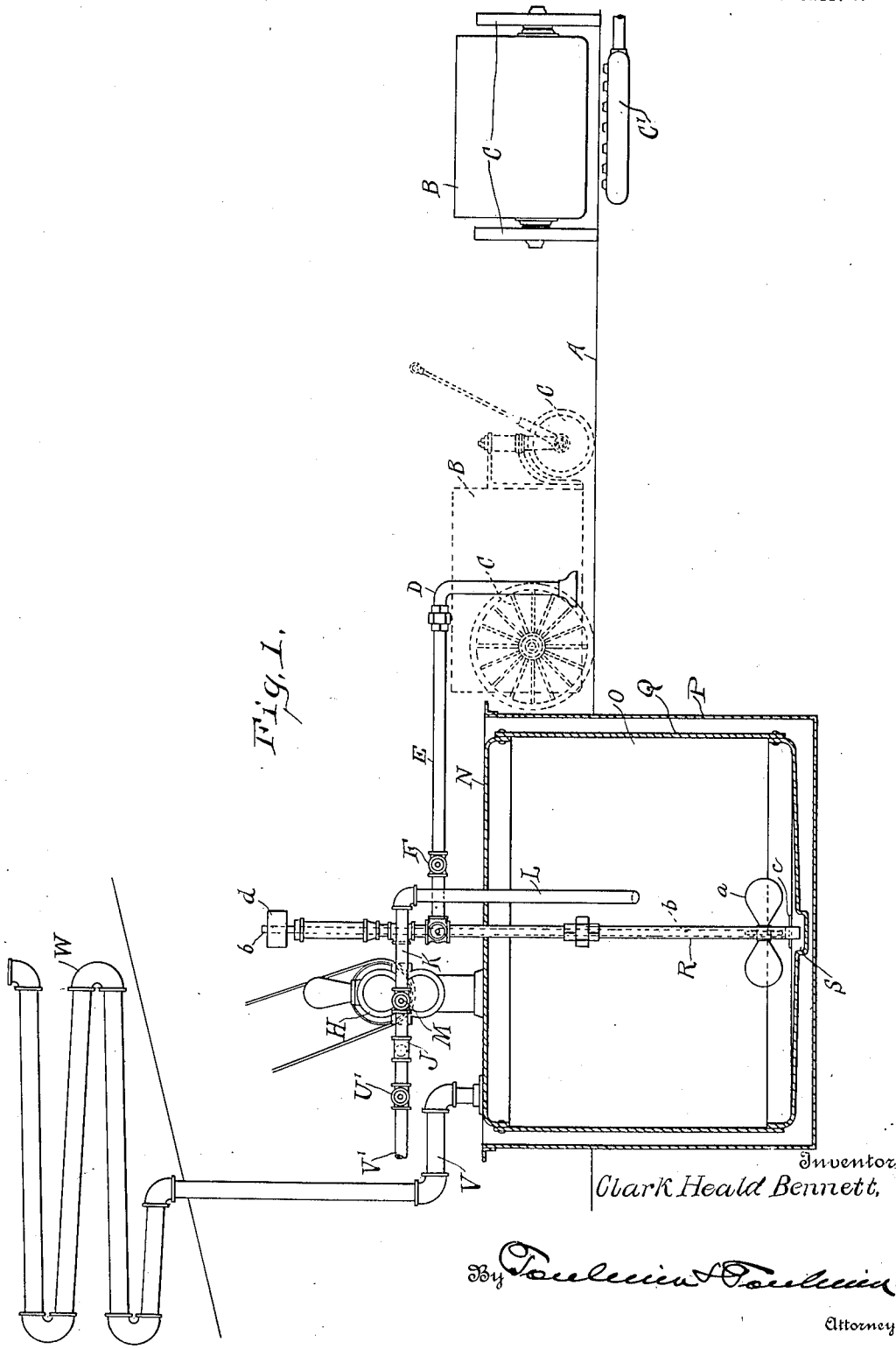

C. H. BENNETT.
APPARATUS FOR MANUFACTURING VARNISH.
APPLICATION FILED MAY 18, 1916.

1,298,159.

Patented Mar. 25, 1919.
3 SHEETS—SHEET 1.

Inventor
Clark Heald Bennett,

By Toulmin & Toulmin
Attorneys

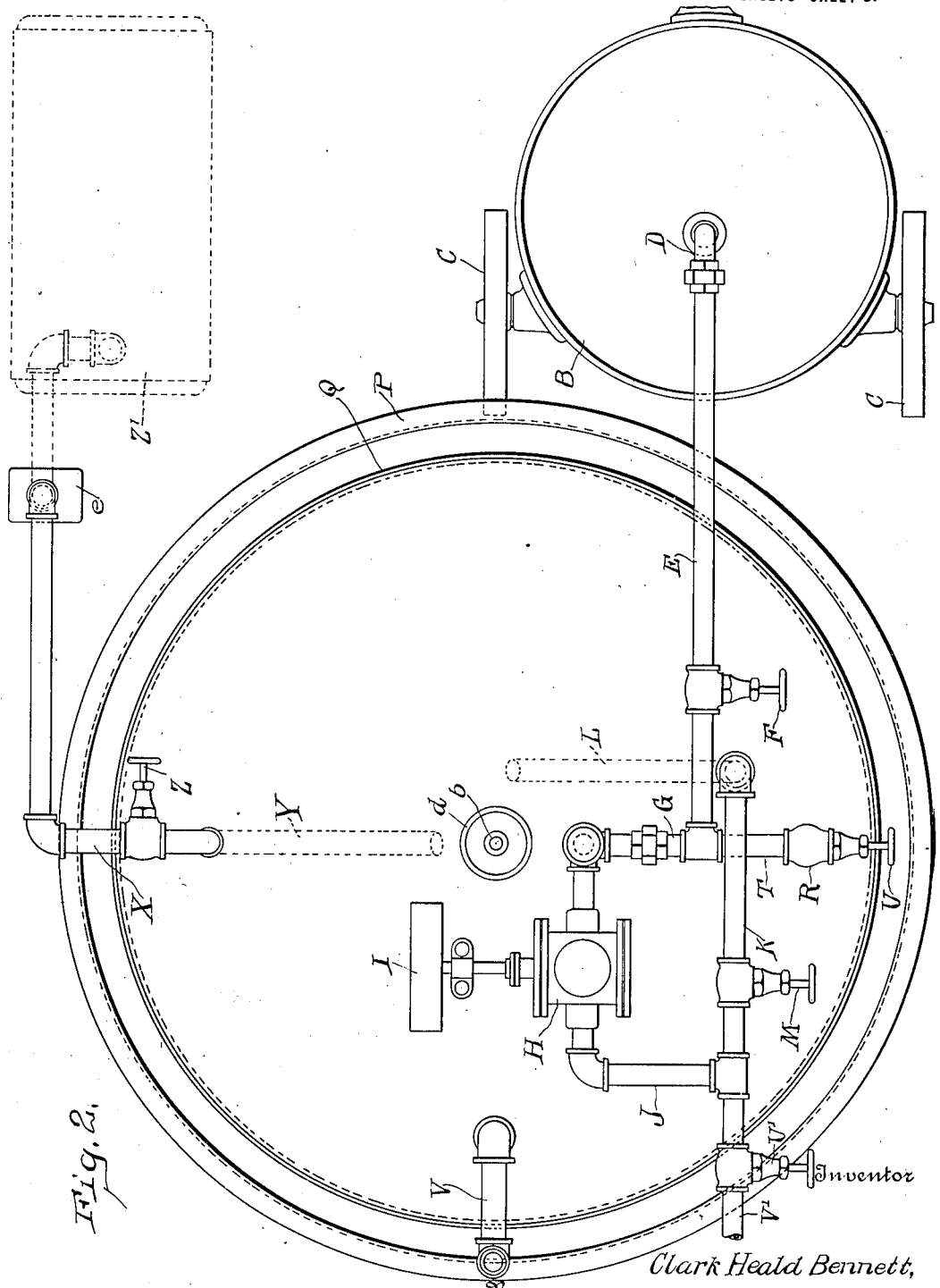

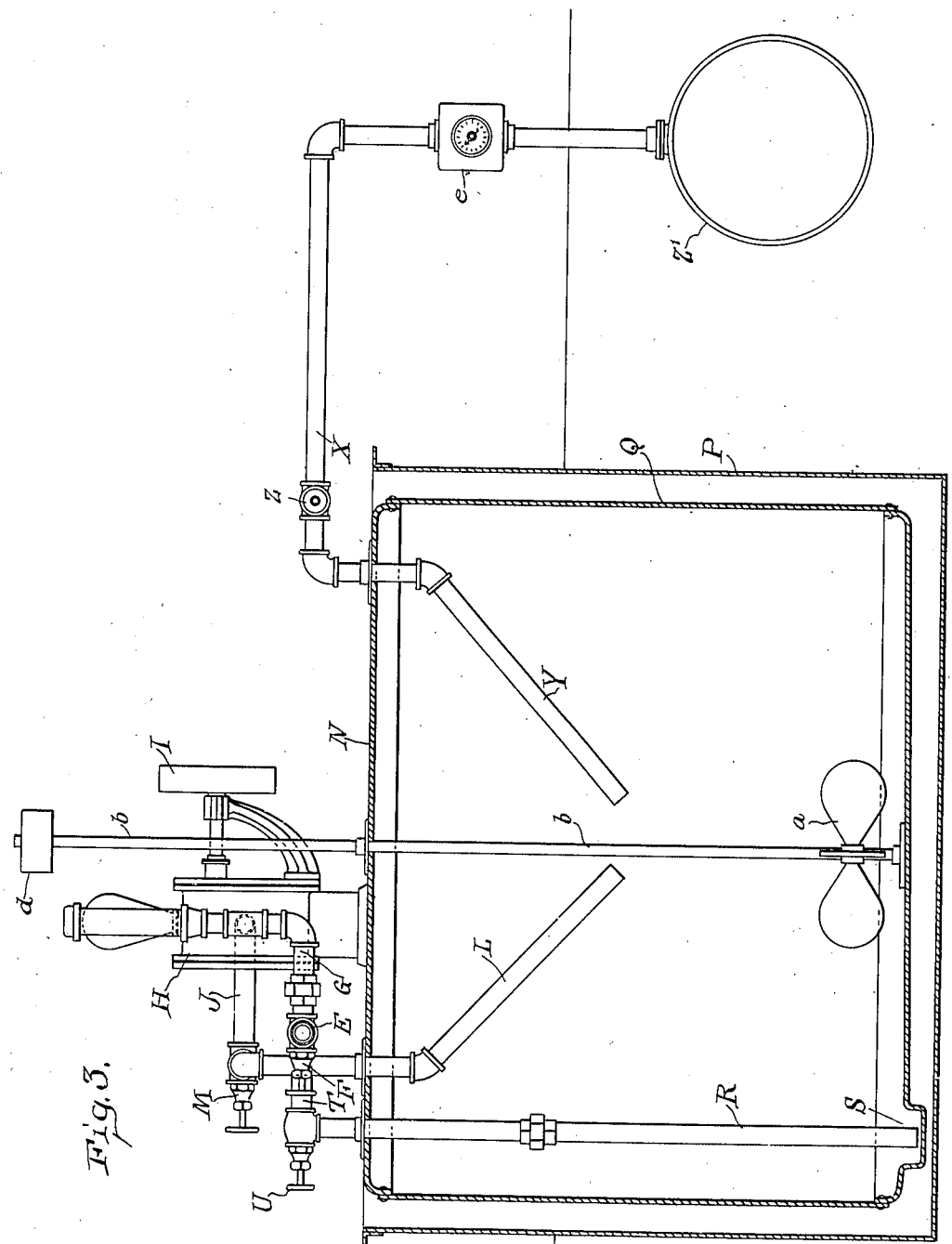

UNITED STATES PATENT OFFICE.

CLARK HEALD BENNETT, OF CHICAGO, ILLINOIS.

APPARATUS FOR MANUFACTURING VARNISH.

1,298,159.   Specification of Letters Patent.   Patented Mar. 25, 1919.

Application filed May 18, 1916.   Serial No. 98,283.

*To all whom it may concern:*

Be it known that I, CLARK HEALD BENNETT, a citizen of the United States, residing at Chicago, in the county of Cook and State of Illinois, have invented certain new and useful Improvements in Apparatus for Manufacturing Varnish, of which the following is a specification, reference being had therein to the accompanying drawing.

This invention relates to an apparatus for manufacturing varnish.

The primary object of the invention is to prevent the now common loss of a substantial per cent. of the solvent used in "blending" or reducing the thick body or cooked batch of the composition to the required consistency, which loss occurs during the introduction of the solvent into such "body" or "batch".

In the manufacture of varnish as commonly or universally practised, after a batch of ingredients composing the "body" has been cooked, it is "blended", that is to say, the requisite quantity of a solvent, such as naphtha or turpentine, is mixed therewith for the purpose of effecting the requisite consistency or viscosity of the resulting product or varnish.

In doing this the "blending" is done in an open kettle, that is to say, when the body or batch has been sufficiently cooked and is ready for the addition of the solvent, the solvent is poured or otherwise introduced into the kettle and down upon the batch. The batch is hot, varying all the way from 250 degrees to 650 degrees Fahrenheit. This heat in the batch causes a rapid and large volatilizing of the solvent. The mass foams and boils, as it were, and the general resulting vaporization, in the nature of fumes rising from the hot mass, causes a serious and expensive loss of as much as 25 per cent. of the solvent, which rises from the kettle and thence escapes into the atmosphere or, in some cases, is attempted to be drawn off through a pipe, say of twelve inch diameter, projecting into the open mouth of a kettle of several feet in diameter. Such pipes have sometimes had an induced draft, as by a fan, or been connected with a stack. In this way most of the fumes, with the volatilized solvent, are carried off, and much of the solvent is lost, entailing serious expense in manufacture.

In some instances imperfect attempts have been made to reclaim some of the volatilized solvent, as by traps in this fumespipe, into which small or negligible quantities of the solvent vapor will condense and be later taken out of the traps. That is as far as the art has progressed in respect of reclaiming any portion of the valuable and expensive solvent, the mixing of which with the batch is accompanied by such a serious vaporization. It is here that my invention comes into play and, pursuant to its primary object, it comprises an apparatus for carrying on the indispensable step of "blending" or introducing the solvent into the batch without loss of any, or any appreciable amount, of the solvent.

By my apparatus this step of introducing the solvent into the batch is done in a closed vessel, into which the batch and solvent are introduced separately, or at the same time, preferably the latter, so that the resulting vaporization and gases, due to the heat of the batch, are confined and a pressure is created, and the vessel is provided with a reclaiming pipe or flume opening into it and connected with or forming a condenser by which the vaporized solvent passing into the pipe by reason of the pressure in the vessel is condensed and thence returned to the batch in the vessel in liquid form, with practically no loss of the solvent.

Thus by my invention I not only save large quantities of the solvent, as, for instance, I am enabled to use 122 gallons of solvent, such as naphtha or turpentine, to give the right viscosity to a given batch, where without my invention I have been required to use 140 gallons of solvent for a like sized batch, but I also introduce a factor of safety against fires by eliminating the open vessel and the consequent discharge of fumes which heretofore have often caused fire; I make it possible to check or prevent "bodying", that is, congealing of the batch, because I can introduce the solvent irrespective of the temperature of the body; and I am enabled to insure definite proportions of batch and solvent, because unknown quantities of the solvent are not lost, but all of the solvent introduced is ultimately utilized by the combined operation of its original absorption by the body as introduced and the subsequent absorption of the reclaimed condensed portion.

My apparatus has been put to practical use, and the statements contained herein are based upon known results.

The details of the apparatus will be hereinafter stated in detail.

In the accompanying drawings, Figure 1 is a partial vertical section and partial side elevation of the cooking kettle and "blending" vessel with their connecting pipes, co-acting pump and reclaiming pipe or flume, constituting the essentials of my apparatus; Fig. 2 is a plan view of the same instrumentalities; and Fig. 3 is a partial vertical sectional view of the blending vessel and elevation of the pump and certain pipes.

In respect of my apparatus I would state that it is located in a building in which the floor A is somewhat elevated, for the location of the cooking kettle B, which preferably is mounted upon supporting wheels C, by which it may be moved from one position to another, as, for instance, from that shown in the extreme right of Fig. 1, in full lines, to that shown at the left in said figure, in dotted lines. A suitable heating medium, such as a series of gas burners, at C', is used to create the heat under the kettle. In this kettle is placed the compound of which the body of the varnish is to be made, an example of which may be stated to be 100 pounds of gum or rosin, 46 gallons of china wood oil, 5 gallons of linseed oil, 7 pounds of litharge and one pound of red lead, which, after being placed in the cooking kettle and cooked in the usual manner known in this art is to be mixed or "blended" with a suitable solvent, as naphtha or turpentine, to give the mass the proper consistency or viscosity.

The cooking is done with the kettle placed in the usual manner shown in full lines in Fig. 1, a suitable burner or other heating medium being applied to the exterior of the kettle. When this has been done according to the practice in this art, then the kettle is moved over on the floor A to the position shown in dotted lines, where its discharge pipe D is to be coupled with the supply pipe E of the blending vessel. This pipe E has a cut-off, as at F, and thence connects with the pump intake pipe G coupled to a suitable pump H, say a rotary pump of any approved commercial type, to be operated by a belt applied to its pulley I. This pump has a discharge pipe J which connects with the supply pipe proper, designated K, which leads through its branch L into the blending vessel. The pipe K is supplied with a valve or cut-off M. The purposes of these cut-offs will appear later.

By preference these several pipes and the pump are mounted on the cover N of the blending vessel O, the latter being preferably constructed of an outer casing P and an inner casing Q spaced apart both at the sides and bottom to leave a non-conducting space, tending to keep the heat from radiating from the inner casing Q, or if desirable permitting the introduction of water or other cooling medium for more rapidly cooling the contents of the vessel O or the introduction of a heating medium for maintaining the heat of the contents of the vessel O. A discharge pipe R for the vessel extends down through it and into a well or sump S for the complete extraction of the contents or product of the blending vessel by the action of the pump H, with which it connects by a branch pipe T leading to the pipe G. A cut-off or valve U is located at the juncture of the discharge pipe R and its branch T.

The blending vessel is further provided with a reclaiming flume or pipe V, preferably mounted on the cover N. This flume leads away to some suitable point where it, or a portion of it, constitutes a condenser W. The condenser portion of the flume may be exposed at a point outside or on the roof of the building, a location suggested in Fig. 1.

The blending vessel is further provided with a solvent supply pipe having its portion Y within the vessel, preferably at an angle with and discharging near the supply pipe L for introducing the "body" or batch from the kettle into the blending vessel. The solvent pipe also has a valve or control Z and thence leads to any suitable supply of the solvent, as a tank Z'.

By preference, though not of necessity, the blending vessel is equipped with an agitator in the nature of a series of blades $a$ mounted on a suitable shaft $b$ stepped at $c$ and extending thence through the cover N to a suitable point and provided with a pulley $d$ operable by a belt. The function of this device is to stir and agitate the mass or body in the vessel during the time of introducing the solvent.

Referring now to the mode of using this apparatus I would state that after the ingredients which constitute the body or batch have been cooked in the kettle B and the kettle has been advanced to the position shown in dotted lines and its pipe D has been coupled with the pipe E, power is turned on the pump and the contents of the kettle drawn through the pipes D and E, thence through the pump inlet pipe G, discharge pipe J and on to the supply pipes K and L into the blending vessel.

When the varnish or product is to be withdrawn from the vessel the valves or cut-offs F and M are closed and the valves or cut-offs U and U' in the leading off branch pipe V' closed. Then when the pump is put in operation it draws the varnish or product from the vessel through the pipes R and G and discharges it through the pipes J and V' to some suitable receptacle.

During the introduction of the batch or body into the blending vessel the solvent is also introduced. The relative positions of the pipes L and Y, as seen in Fig. 3, are such as to cause the "body" and the solvent to come in contact and begin their admixture one with the other, a step which more thoroughly intermixes them and hastens the incorporation of the solvent into the body and thereby hastens the resulting viscosity of the product. But it will be understood that the solvent may be introduced after the body is entirely within the vessel, and that the particular mode of introducing the body and the solvent is not essential, though the mode illustrated and here described is preferred.

But the contact of the solvent with the body, which is in a highly heated state at this time, no matter whether they are introduced simultaneously or one after the other, brings about a rapid vaporization, particularly of the solvent, which usually being naphtha or turpentine is highly volatile.

The vapor thus created quickly fills the entire interior of the blending vessel, even to the extent of creating a pressure which, if unrelieved, would become dangerous. But the vapor, by reason of this pressure, is driven up or through the reclaiming pipe or flume. By the time the vapor reaches the farther end of the flume I find there is little or no discharge, as all that is appreciable of the vapor has been condensed. This condensation flows back through the reclaiming pipe or flume into the blending vessel.

As a result of this apparatus practically the entire quantity of solvent measured, say by a meter $e$ interposed in the solvent pipe, is preserved and utilized for admixture with the body of the material in reducing it from its thick state to the required viscosity.

In the practical use of my apparatus in a varnish works the saving by reason of this reclaiming of the otherwise lost solvent amounts to large sums of money ranging, for instance, from, say thirty dollars a day on up according to the quantity of varnish daily manufactured, the usual cost of the solvents, such as naphtha and turpentine, ranging from ten cents per gallon to 70 cents per gallon. I have already stated that in the practical operations of my varnish plant I have made 122 gallons of solvent perform the same office in my apparatus as required 140 gallons without such apparatus. This is an illustration of the commercial utility of my apparatus.

Having thus fully described my invention, what I claim as new and desire to secure by Letters Patent, is:—

1. In an apparatus for the manufacture of varnish, the combination, with a cooking kettle and a closed blending vessel, of a pump, pipe connections therefrom to draw the material from the kettle into the vessel, and other pipe connections to draw the product from the vessel, means for introducing a solvent into the vessel, and a condenser communicating with the interior of the vessel and adapted to receive vapor therefrom and to condense and return it to the vessel.

2. In an apparatus for the manufacture of varnish, the combination, with a cooking kettle and a closed blending vessel, of a pump, and connections therefrom to the kettle and to the vessel to empty the contents of the kettle into the vessel in a stream, a pipe adapted to receive a solvent and extended to near the entrance of the other material into the vessel, so that the solvent and such material will intermix as they enter the vessel, other pipe connections from the pump to within the vessel to discharge the product therefrom, and a condenser communicating with the interior of the vessel and adapted to receive vapor therefrom and to condense and return it to the vessel.

3. In an apparatus for the manufacture of varnish, the combination, with a movable cooking kettle adapted to cook a varnish composition at one point and to convey the composition to another point away from the heating medium, and a closed blending vessel located distant from the heating medium and to near which the kettle is adapted to be moved, of a pump, and pipe connections from it adapted to be coupled with the discharge pipe of the kettle when near the vessel and to deliver the contents of the kettle into the vessel.

4. In an apparatus for the manufacture of varnish, a closed blending vessel, means for introducing a varnish compound and other means for introducing a solvent into said vessel, a pipe extending down into the lower part of the vessel, a pump connected with said pipe and adapted to draw the contents of the vessel therefrom, and a solvent reclaiming pipe communicating with the interior of the vessel, extended thence to condense the vaporized solvent, and adapted to perform the two functions of receiving the solvent vapors and of returning to the vessel the liquid arising from the condensation of said vapors, whereby the vessel is fed with varnish composition, is fed with solvent, is exhausted of solvent vapors and fed with the condensation of said vapors.

In testimony whereof, I affix my signature.

CLARK HEALD BENNETT.